(12) United States Patent
Bai et al.

(10) Patent No.: US 6,311,152 B1
(45) Date of Patent: Oct. 30, 2001

(54) SYSTEM FOR CHINESE TOKENIZATION AND NAMED ENTITY RECOGNITION

(75) Inventors: Shuanhu Bai; Horng Jyh Paul Wu; Haizhou Li; Gareth Loudon, all of Singapore (SG)

(73) Assignee: Kent Ridge Digital Labs, Singapore (SG)

(*) Notice: Subject to any disclaimer, the term of this patent is extended or adjusted under 35 U.S.C. 154(b) by 0 days.

(21) Appl. No.: 09/403,069
(22) PCT Filed: Apr. 8, 1999
(86) PCT No.: PCT/SG99/00029
§ 371 Date: Feb. 17, 2000
§ 102(e) Date: Feb. 17, 2000
(87) PCT Pub. No.: WO00/62193
PCT Pub. Date: Oct. 19, 2000

(51) Int. Cl.[7] .................. G06F 17/27; G06F 17/20; G10L 15/18
(52) U.S. Cl. ............... 704/9; 704/8; 704/251; 704/257
(58) Field of Search ............... 704/9, 10, 1, 251, 704/255, 256, 257, 242, 243; 707/530, 531, 532, 536, 535

(56) References Cited

U.S. PATENT DOCUMENTS

| | | | |
|---|---|---|---|
| 5,109,509 | 4/1992 | Katayama et al. | 704/9 |
| 5,212,730 | 5/1993 | Wheatley et al. | 704/293 |
| 5,819,265 | 10/1998 | Ravin et al. | 707/5 |
| 5,832,480 | 11/1998 | Byrd et al. | 707/5 |

FOREIGN PATENT DOCUMENTS

WO 97/40453  10/1997  (WO).
WO 97/41680  11/1997  (WO).

OTHER PUBLICATIONS

Cucchiarelli et al. "Automatic Semantic Tagging of Unknown Proper Names", Proceedings of Coling–ACL'98, pp286–292, 1998.
Borthwick et al. "Exploiting Diverse Knowledge Source via Maximum Entropy in Named Entity Recognition", pp152–160, Proceedings of Sixth Workshop on Very Large Corpora, 1998.
Shuanghu et al. "Building class–based language models with contexual statistics", Proceedings of ICASSP'98, pp173–176, Seattle Washington, USA, 1998.
Bikel et al. "Nymble: a High–Performance Learning Name–Finder" cmp–lg/9803003.
Nam et al. "A Local Grammar–based Approach to Recognising of Proper Names in Korean Text", Proceedings of Fifth Workshop on Very Large Corpora, pp273–288, 1997.

*Primary Examiner*—Joseph Thomas
(74) *Attorney, Agent, or Firm*—Nath&Associates PLLC; Harold L. Novick

(57) ABSTRACT

A system (100, 200) for tokenization and named entity recognition of ideographic language is disclosed. In the system, a word lattice is generated for a string of ideographic characters using finite state grammars (150) and a system lexicon (240). Segmented text is generated by determining word boundaries in the string of ideographic characters using the word lattice dependent upon a contextual language model (152A) and one or more entity language models (152B). One or more named entities is recognized in the string of ideographic characters using the word lattice dependent upon the contextual language model (152A) and the one or more entity language models (152B). The contextual language model (152A) and the one or more entity language models (152B) are each class-based language models. The lexicon (240) includes single ideographic characters, words, and predetermined features of the characters and words.

21 Claims, 10 Drawing Sheets

SYSTEM FOR CHINESE TOKENIZATION AND NAMED ENTITY RECOGNITION

FIELD OF THE INVENTION

The present invention relates to the field of natural language processing, and in particular to systems for tokenizing and recognizing named entities in a text corpus of an ideographic language.

BACKGROUND

Natural language processing is an area of technology experiencing active research interest. In particular, significant activity has been undertaken in respect of the English language with positive results. However, little activity has been reported for ideographic languages such as Chinese. In an ideographic language, a word is made of one or more ideograms, where each ideogram is a symbol representing something such as an object or idea without expressing its sound(s).

The task of tokenizing ideographic languages such as Chinese and recognizing named entities (i.e., proper names) is more difficult that of the English language for a number of reasons. Firstly, unlike English, there are no boundaries between words in Chinese text. For example, a sentence is often a contiguous string of ideograms, where one or more ideograms may form a word, without spaces between "words". Secondly, the uniformity of character strings in the Chinese writing system does not indicate proper names. In the English language, capitalization indicates proper names. The capitalized feature of proper names in English provides important information on the location and boundary of proper names in a text corpus.

Therefore, a need clearly exists for a system for tokenization and named-entity recognition of ideographic language.

SUMMARY

In accordance with a first aspect of the invention, there is disclosed a method of tokenization and named entity recognition of ideographic language. The method includes the steps of generating a word lattice for a string of ideographic characters using finite state grammars and a system lexicon, generating segmented text by determining word boundaries in the string of ideographic characters using the word lattice dependent upon a contextual language model and one or more entity language models; and recognizing one or more named entities in the string of ideographic characters using the word lattice dependent upon the contextual language model and the one or more entity language models.

Preferably, the method further includes the step of combining the contextual language model and the one or more entity language models. The contextual language model and the one or more entity language models may each be class-based language models.

Preferably, the contextual language model and the one or more entity language models incorporate local and contextual linguistic information, respectively, for producing prioritized word and corresponding category sequences. The contextual language model and the one or more entity language models may be dependent upon an n-gram paradigm.

Preferably, the lexicon includes single ideographic characters, words, and predetermined features of the characters and words. The lattice-generating step may include the step of generating one or more elements of the lattice using the lexicon.

Optionally, the finite state grammars are a dynamic and complementary extension of the lexicon for creating named entity hypotheses. The finite state grammars may run on the predetermined features contained in the lexicon to suggest possible entities, entity boundaries and entity categories.

In accordance with a second aspect of the invention, there is disclosed an apparatus for tokenization and named entity recognition of ideographic language, the apparatus including: a device for generating a word lattice for a string of ideographic characters using finite state grammars and a system lexicon; a device for generating segmented text by determining word boundaries in the string of ideographic characters using the word lattice dependent upon a contextual language model and one or more entity language models; and a device for recognizing one or more named entities in the string of ideographic characters using the word lattice dependent upon the contextual language model and the one or more entity language models.

In accordance with a third aspect of the invention, there is disclosed a computer program product having a computer readable medium having a computer program recorded therein for tokenization and named entity recognition of ideographic language. The computer program product includes: a module for generating a word lattice for a string of ideographic characters using finite state grammars and a system lexicon; a module for generating segmented text by determining word boundaries in the string of ideographic characters using the word lattice dependent upon a contextual language model and one or more entity language models, and a module for recognizing one or more named entities in the string of ideographic characters using the word lattice dependent upon the contextual language model and the one or more entity language models.

BRIEF DESCRIPTION OF THE DRAWINGS

A small number of embodiments of the invention are described hereinafter with reference to the drawings, in which.

DETAILED DESCRIPTION

Figure 1:
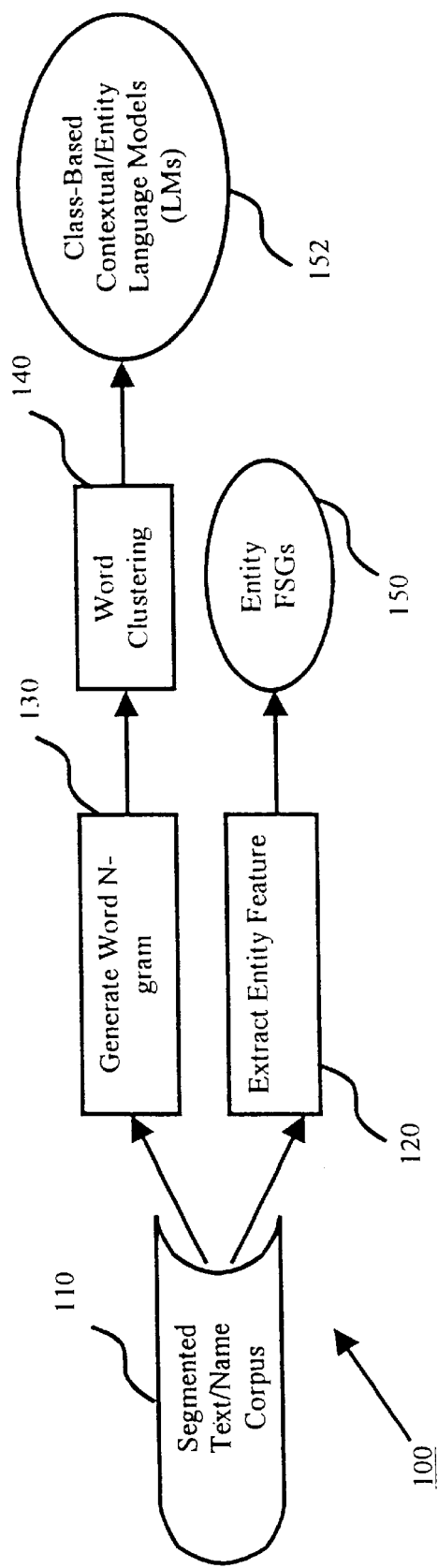
FIG. 1 is a block diagram of a training module 100, forming part of a system for tokenization and named-entity recognition of ideographic language in accordance with a first embodiment of the invention.

A method, an apparatus, a computer program product and a system for tokenization and named entity recognition of ideographic language are described. In the following description, numerous details are set forth including specific ideographic languages, word clustering techniques, and the like, for example. It will be apparent to one skilled in the art, however, that the present invention may be practised without these specific details. In other instances, well-known features are not described in detail so as not to obscure the present invention.

In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The embodiments of the invention build different grammars for different proper names (PN) or named entities. The grammars are used to make hypotheses to find possible proper names in a body of text. To do so, proper name or named entity statistical models are built to derive scores for names. Also, contextual language models are built to evaluate the problem of what type of proper name is found. These two kinds of models are combined to evaluate the score for the whole sentence, where the body of text is processed sentence-by-sentence.

The tokenization and named-entity recognition system segments character strings of ideographic language (e.g., Chinese, Korean, Japanese, and the like) sentences into word form sentences. Tokenization is the process of determining the boundaries of meaningful units of a sentence(s) in a given context for an ideographic language. In this sense, the system can be thought of as a segmentor. The system then identifies and categorizes named entities in a given body of text. The segmentor decomposes a string of ideographic characters into a word lattice according to system dictionary entries. The entity recognition portion of the system finds possible entities within the lattice by applying finite state grammars (FSGs) to the lattice structure. Finally, statistical ambiguity resolution processing is applied to the lattice to find the most probable word boundaries and the categories of newly suggested named entities.

Given an ideographic language (e.g., Chinese) text corpus, categorised name corpus and a word list that contains all ideographic characters and some proper names as seeds, the system is used to perform tokenization and name recognition. In one sense the system acts as a segmentor that simply determines word boundaries. The system also acts as a name recognizer to determine boundaries and categories of names in text. A name can consist of one or more words. Because there are no capitalized features of names in ideographic languages, e.g. Chinese, the process of determining boundaries of names is difficult. The tokenization and name recognition system operates as follows:

(1) Run the decoder module (200 of FIG. 2) as a segmentor and segment the characterstring text and name corpus into word-string format. A single text corpus can be used, which preferably is a collection of materials from newspapers, magazines, books, etc. Initially, the contextual and entity models are not present and a longest matching method is applied by a statistical decoder to lattices produced by a lattice constructor. Each entity model corresponds to an entity corpus consisting of lists of names (entities). For example, a person's name model can be built from a person's name corpus. Likewise, an organization name model can be built from an organization name corpus, and so on. Then, word n-grams (e.g., uni-gram and bi-gram) are generated and the relevant statistics are calculated for the text corpus and different name corpus.

(2) Apply word-clustering to create word classes for the contextual and name models, respectively, and build class-based language models for the contextual and entity models. Apply feature extraction to extract features of the words used in the names. A language model is probability data derived from a training corpus; it can also be the mechanism or formulas for estimating the probabilities of word sequences. The contextual and entity models are probability data derived from the training corpus and the mechanism of estimating the probabilities of word sequences. Again, the contextual model is derived preferably from a text corpus containing text from newspapers, magazines, books, etc. Entity models are derived from a name or entity corpus. The contextual and entity models employ preferably the same mechanism for estimating the probabilities of word sequences. The contextual and entity models can be either word or class-based, but are preferably class-based. A word-based language model is a direct and simple mechanism that calculates probabilities of word sequences by multiplying the probability of each word (word unigram model) or by multiplying of each n-1 preceding words in the word sequences. This can give rise to parameter explosion and a sparse data problem. A class-based language model overcomes' these problems. This model uses classes fewer in number to estimate the probabilities of word sequences, rather than the words themselves, by mapping groups of words into classes according to predetermined criteria. While both manual (e.g., using part of speech svmbols) and automatic methods are available, it is preferable to use automatic methods in accordance with the embodiments of the invention. A class bi-gram method is described hereinafter with reference to Equation (2).

(3) Integrate the contextual language and entity models and entity FSGs in the segmentor.

(4) Segment the text corpus with the (new) segmentor obtained in (3).

(5) Repeat steps (2), (3), (4) until optimal performance is achieved. Preferably, this is done three times, although other numbers of times may be practiced without departing from the scope and spirit of the invention.

The embodiments of the invention implement a statistically based system. The system can be trained using off-the-shelf data that can be readily obtained. Further, the system is self-organized, and little human interaction is required to operate the system. Nonetheless. the system is able to perform well in terms of named entity recognition accuracy and efficiency. Still further, the entity models and the contextual models are well organized. The system is able to perform tokenization and named entity recognition at the same time.

The foregoing advantages arise for a number of reasons. Firstly, the system segments character strings in ideographic language (e.g., Chinese) into word sequences and identifies accurately unregistered entities, such as the name of a person, organization, place, and so on. Further examples of named entities are given hereinafter. Secondly, the system assigns correct word categories to recognized entities. Thirdly, the operation of the system is automatic and self-organized. Handcrafted data is not required for training. Given an appropriate amount of training data, robust statistical language models can be created to model the contextual constraints of words and the individual structures of named entities. Fourthly, the system operates based on the framework of Hidden Markov Models (HMMs). Class-based language models are employed in both the contextual model and the entity models. Some word classes can be automatically generated from text corpus for contextual models and are not only used as HMM states in a statistical decoding process, but are also entity class identifications, preferably after minor handcrafting. Fifthly, the system does not require a large name dictionary embedded in the system. Using a static lexicon, a productive engine is built that generates names according to grammatical rules both statistically and deterministically. Further aspects of the embodiments are described hereinafter.

System Architecture

Figure 2:
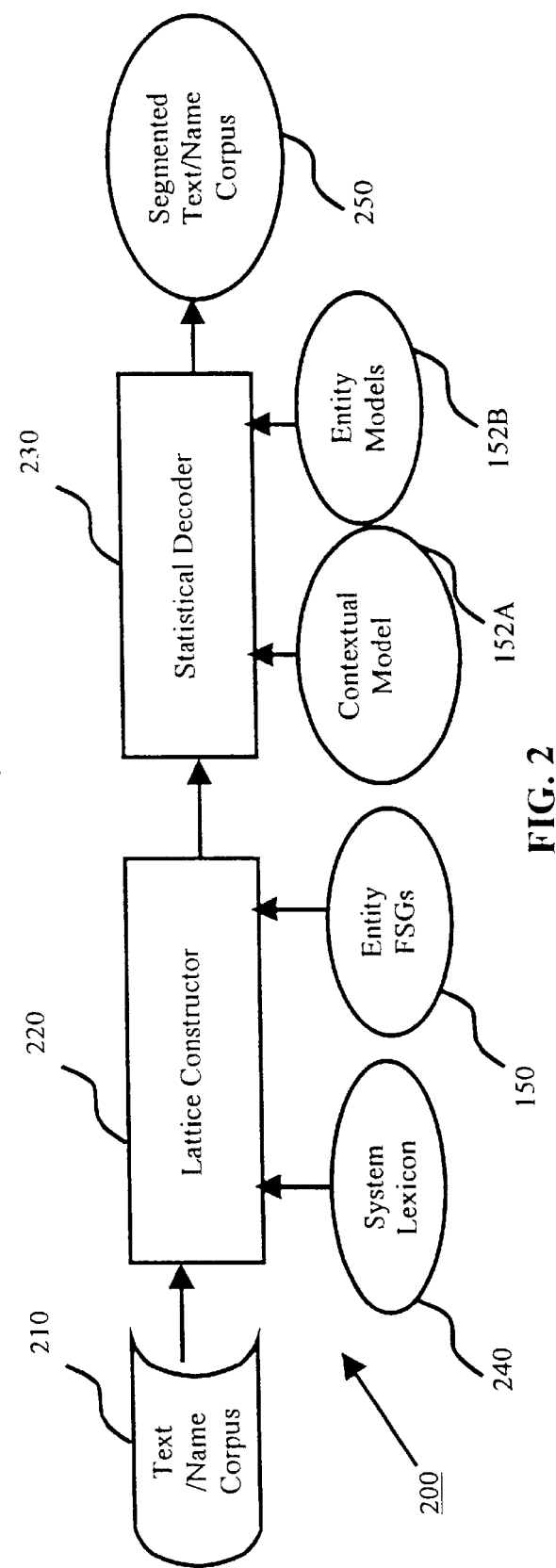
FIG. 2 is a block diagram of a decoding module 200, forming part of the system for tokenization and named-entity recognition of ideographic language in accordance with a first embodiment of the invention.

FIGS. 1 and 2 are block diagrams illustrating a system for tokenization and named-entity recognition of ideographic language in accordance with a first embodiment of the invention. The system includes two principal modules: a training module 100 and a decoding module 200. The system uses two knowledge bases: a contextual model 152A and name entity models 152B. A name entity is a proper name (PN). Preferably, there are seven categories of named entities: person, place, organization, date, time, percentage, and monetary amount. Thus, for example, one category of named entity is that for the name of a person, such as "John Doe". However, other categories can be utilized without departing from the scope and spirit of the invention. Each type of named entity has its own model. The models are similar for different kinds of named entities; only the training data to make the models are different. A class-based n-gram model is used preferably as the basic framework for these models 152A and 152B.

The system of FIGS. 1 and 2 converts character strings of ideograms (e.g., forming a sentence) in an ideographic language (e.g., Chinese, Japanese, Korean, and the like) into word sequences. The system identifies and categorizes members of certain categories of named entities from word sequences of a given text corpus.

Referring first to FIG. 1, the training module 100 has two sub-modules or branches: a language-model training branch and a module for deriving an entity finite state grammar (FSG). The FSG suggests different names based on combinations of characters. For person names, it can derive family name and given names. An FSG is a machine that produces or recognizes certain kinds of syllable sequences. For example, an FSG for generating person's name is: Pn→Pnb Pnc Pne. The person's name (Pn) can comprise a person's name begin (Pnb), a person's name continue (Pnc), and a person's name end (Pne). Examples of Pnb are: Pnb→Bai|Li|Wang| . . . , where each of the foregoing is a person's family name preferably. Examples of Pnc are: Pnc→Shuan|nil| . . . Thus, a person's name continuous can be Shuan, empty syllable string, or something else. Examples of Pne are: Pne→Hu| . . . The foregoing are rules of the FSG. The upper branch represents language model training processing where both contextual model and entity models are trained. The class-based model is preferably a Hidden Markov Model (HMM). The lower branch of FIG. 1 represents entity feature extraction processing. A segmented text/name corpus 110 is input to a module 130 for generating word n-grams and a module 120 for extracting entity features. The training data has the ideograms of the corpus 110 segmented into words.

In the language model training branch, the word N-gam generation module 130 is coupled to a word-clustering module 140, which produces and outputs class-based contextual/entity language models (LMs) 152. N-gram refers to up to N words. A single ideogram word is a uni-gram, a two ideogram word is a bi-gram, and so on. The word n-gram generation module 130 generates word n-gram statistical data from the segmented text/name corpus. The word n-gram statistical data is passed to the word-clustering module 140 to generate word classes and class n-gram data. The most common n-grams are uni-grams and bi-grams, but other n-grams may also be practised.

Thus, the language-model training branch generates word N-gram statistics, word classes, and a class n-gram language model from the segmented text/name corpus 110. The class-based language model 152 reduces storage requirements due to the many-to-one mappings. More importantly, the class-based language model creates word classes that associate proper names or named entities. These entity classes play an important role in the decoding module 200 for disambiguation of named-entity categories. The training branch including modules 130 and 140 is applicable to both a contextual model and entity models. The method of estimating the probabilities of word sequences is applicable to the generally shorter sequences of entities and larger sequences such as sentences.

The entity-feature extraction module 120 produces and outputs entity finite state grammars (FSGs) 150. The module 120 only takes a segmented name corpus as input to extract the features of the entity constituents. These features can be used to define the entity FSGs 150 for suggesting names later. The relevant features are entity-begin, entity-continuance, and entity-end, as described hereinafter. The module 120 works on lists of proper names to build the FSGs 150 for each category or kind of entity. The entity FSGs 150 is a lexicon including the extracted features of entities.

Referring to FIG. 2, the decoding module 200 includes a lattice constructor module 220 coupled to a statistical decoding module 230. The text/name corpus 210 is input to the lattice constructor module 220. A system lexicon 240 and the entity FSGs 150 are also input to the lattice constructor module 220. For the Chinese language, for example, each ideogram or character is stored in the lexicon as a two-byte word or entry. The contextual model 152A and entity models 152B are input to the statistical decoder module 230. The statistical decoder module 230 produces and outputs the segmented text/name corpus 250.

The decoding module 200 processes text sentence-by-sentence in two stages. Given a ideographic language (e.g., Chinese) sentence, the module 200 finds all possible segmentations of the sentence and makes -hypotheses on possible named entity boundaries and named entity classes. This is done using the lattice constructor module 220, dependent upon a system lexicon and the entity FSGs 150. The lattice constructor module 220 reads a sentence from the text/name corpus 210. Using the system lexicon 240 and the entity finite state grammars 150, the lattice constructor module 220 generates all possible word arrangements of the sentence and puts them into a data structure called a lattice according to the starting character of the words. A lattice is a two-dimensional data structure often used to describe a time-synchronized process. The X-axis of the lattice represents time intervals, and the Y-axis represents individual samples. For the case of Chinese segmentation and entity recognition, the time intervals correspond to character orders in the sentence. Samples correspond to words starting with the characters. The lattice for each sentence is output to the statistical decoder module 230.

Using the produced lattices, the module 200 then combines entity models 152B with a contextual model 152A in the statistical decoder module 230 to decide word boundaries and entity categories. Using the contextual model 152A and the entity models 152B, the statistical decoder module 230 goes through all these word arrangements of the lattice and finds the most probable word arrangement and entity category, if any. The processing of the decoding module 200 repeats until the entire text 210 is processed.

Proper Name (PN) Feature Extraction

Named-entity model-training processing (lower branch of training module 100) of FIG. 1 extracts features of the constituents of named entities. This involves the module 120 for extracting entity features. The first embodiment of the invention is preferably practised using the Chinese language. In the Chinese language, there are two kinds of word in Chinese text: static and dynamic. Static words are commonly used words collected in dictionaries according to predetermined standards. On the other hand, dynamic words (e.g., named entities) can only be formed at run time by the combination of static words in the dictionary according to predetermined rules and word features. This is applicable to a Chinese natural language processing (NLP) system, where a system lexicon 240 can contain all single-character words and digits.

In the system according to the first embodiment, named entities are described in the following manner:

$$\text{Entity}=\text{Entity\_Begin}(\text{Entity\_Cont})*\text{Entity\_End} \quad (1)$$

Named entities can have three kinds of constituents: entity-begin, entity-continuance, and entity-end. In a named entity, entity-begin and entity-end can be the same. That is, the word itself is an entity. On the other hand, the words Beijing and China each are a place name and have two features: place-begin and place-end. The entity-continuance can be optional or occur at last n (n>=0) times. As an illustration, a typical expression is:

Hongkong Asia Pacific Satellite Communication Corporation

For a type of named entity that is an organization, the lexical word Hongkong is assigned with an organisation-begin, corporation with an organisation-end and the words Asia, Pacific, Satellite and Communication with the same value of organization-continuance, respectively. Therefore, the constituents of each kind of named entity can have three features.

Because entity constituents are lexicon words, words in a lexicon can have multiple features. In some cases, one word can appear in different types of entity (e.g., person, place, organization, etc.), and even in the same type of entity at a different position. The entity category and the positions where the constituents appear in the names determine the features of the constituents of a named entity. Based on this formulation, with seven types of entity and three types of constituent features, the total number of features is 7×3=21.

Figure 3:
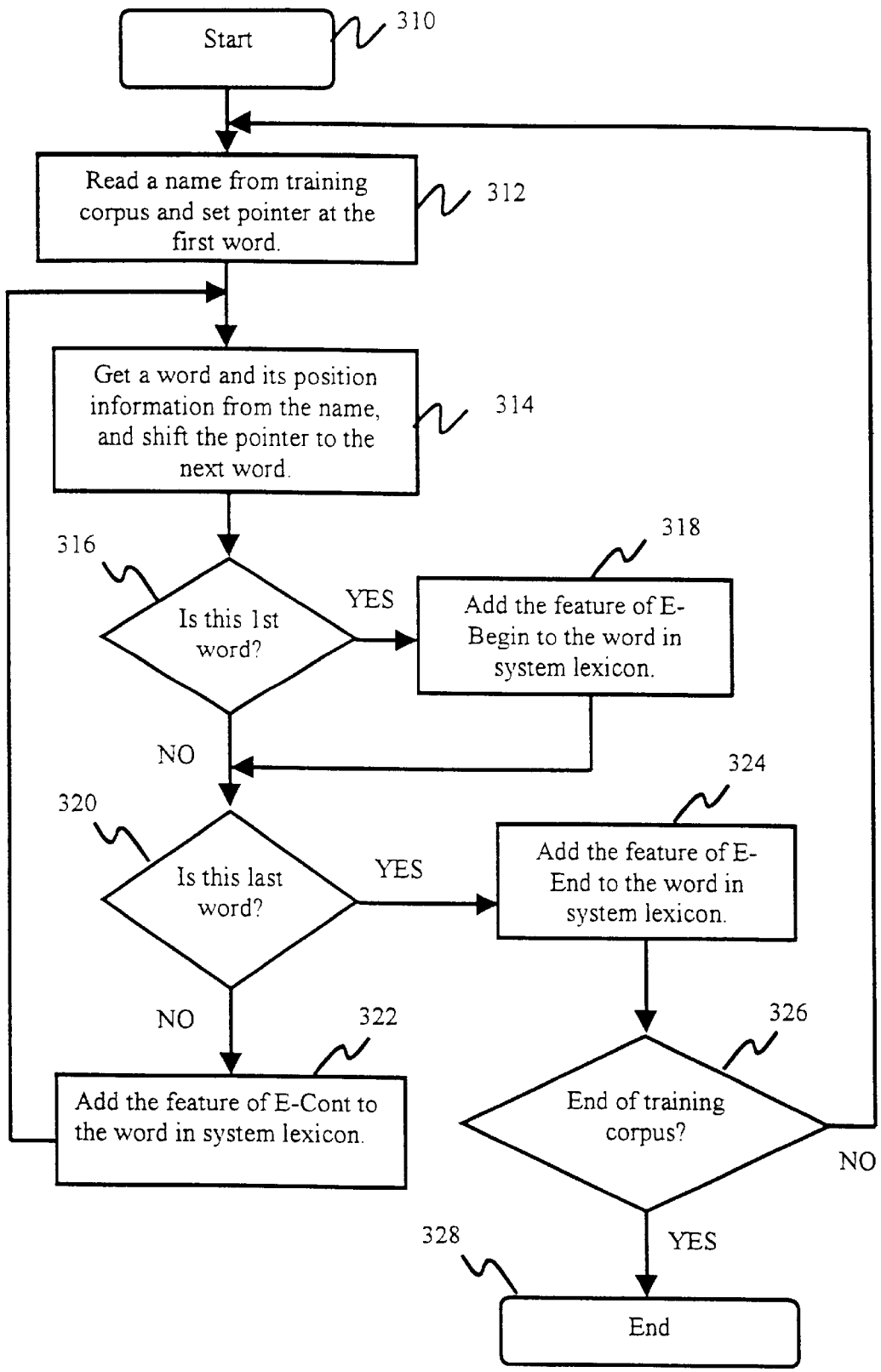
FIG. 3 is a flow diagram depicting the entity-feature extraction processing of the module 120 of FIG. 1.
Figure 9:
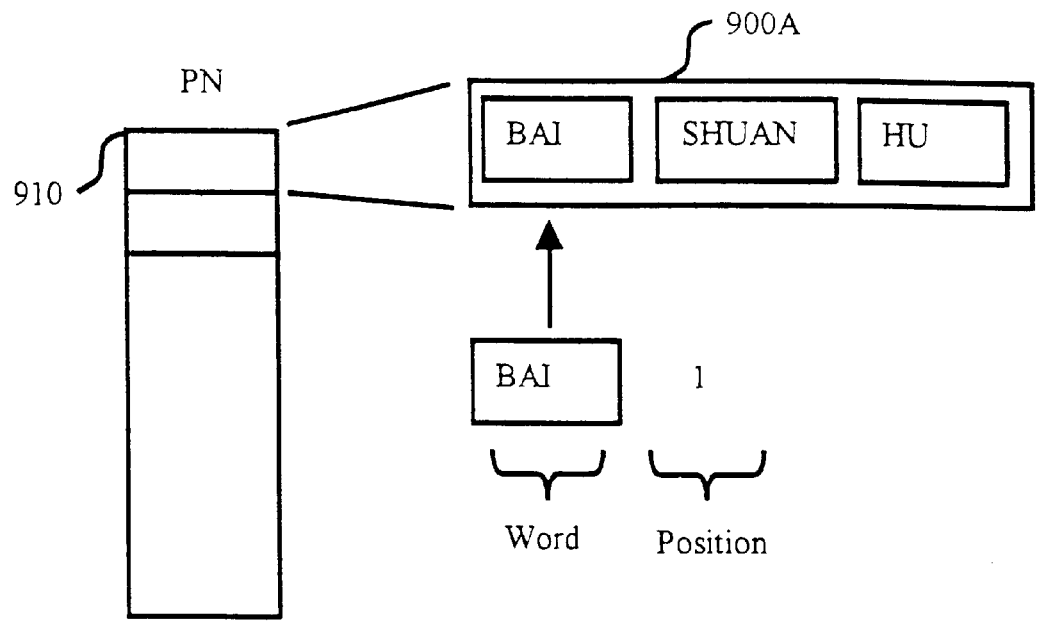
FIG. 9 is a block diagram illustrating a list of proper names from which named entity features can be extracted.

The processing of the module 120 for extracting entity features is described hereinafter with reference to FIG. 3. In step 310, the feature-extraction process commences for a, given lexicon and a particular type of segmented name corpus 110. The segmented name corpus can be organized as a list of named entities. In this connection, a list of named entities 910 is depicted in FIG. 9. The "type" of segmented name corpus means entity type, such as people, place, organization, etc. In step 312, a named entity is read or obtained from the training corpus 110, and the scanning pointer is set at the first word of the named entity. Referring again to FIG. 9, a single entry 900A with the name "Bai Shuan Hu" is depicted. In step 314, the current word and its position information pointed to by the scanning pointer are determined (e.g., "Bai" and "1"in FIG. 9) and the scanning pointer is then moved forward to the next position or word.

Figure 10:
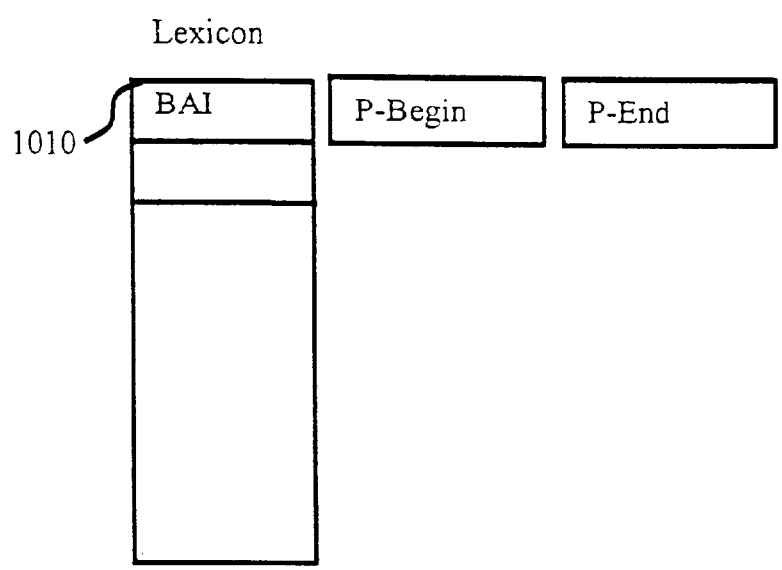
FIG. 10 is a block diagram of a system lexicon including named entity features.

In decision block 316, a check is made to determine if the current word. based on the position information of the word in the entity being processed, is the first word of the named entity. If decision block 316 returns false (No), processing continues at decision block 320. Otherwise, if decision block 316 returns true (Yes), this indicates that the word is the start of a named entity, and processing continues at step 318. In step 318, the feature "entity-begin" or E-Begin is added to this word in the lexicon. The entity category is easily determined by the type(s) of training corpus. In the example of FIG. 9, an entry for "Bai" in the lexicon 1010 of FIG. 10 is given the feature P-Begin for a person's name. Processing then continues at the decision block 320.

In decision block 320, a check is made to determine if the current word is the last word of the named entity, based on the position information of the word in the entity being processed. For example, if a second entry in the list 910 of FIG. 9 simply had the name "Bai", a P-End feature would also be added to the "Bai" entry 1010 of FIG. 10. If decision block 320 returns false (No), processing continues at step 322. In step 322, the feature "entity-continuance" or E-Cont is added to the word and processing continues at step 314 for the next current word. Otherwise, if decision block 320 returns true (Yes) indicating the word is the last one in the entity, processing continues at step 324. In step 324, the feature "entity-end" or E-End is added to the word in the system lexicon. Processing then continues at decision block 326. In decision block 326, a check is made to determine if the end of the training corpus 110 has been reached. If decision block. 326 returns false (No), processing continues at step 312 and another named entity is read from the training corpus 110. Otherwise, if decision block 326 returns true (Yes), feature extraction processing terminates in step 328.

Training Process for Models

The training module (upper branch) of FIG. 1 is applicable to both contextual model and entity model training. The training module itself can be divided into two parts. word n-gram generation and word clustering modules.

The word n-gram generation module 130 goes through the whole training corpus 110 and counts the appearance of adjacent n words. The module 130 calculates the frequencies in the training corpus of the adjacent n words. If n=1 for uni-grams, the module 130 simply counts the frequency of words. If n=2 for bi-grams, the module 130 counts the frequency of word pairs. Similar processing applies if n>2.

For a fixed number of classes in a word list, the automatic word clustering module 140 performs a many-to-one mapping of words to classes, dependent upon the similarities of the words' contextual statistical information. The preferred method of word clustering is disclosed by Bai Shuanhu, Li Haizhou, Li Zhiwei and Yuan Baosheng, "Building class-based language models with contextual statistics", Proceedings of ICASSP'98, pp173–176, Seattle Wash., USA, 1998, the disclosure of which is incorporated herein by cross-reference.

Figure 4:
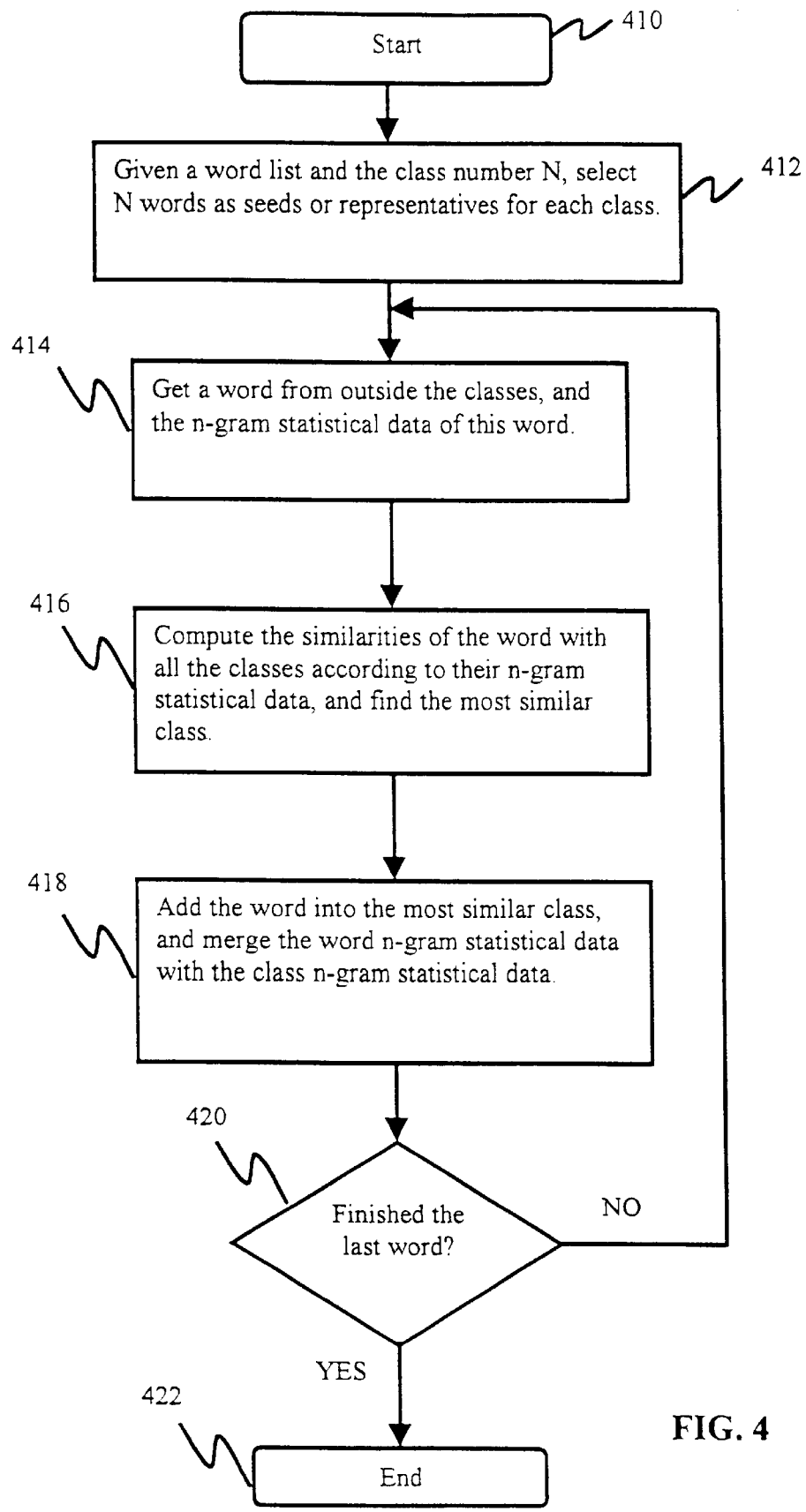
FIG. 4 is a flow diagram depicting the word-clustering processing of the module 140 of FIG. 1.

Referring to FIG. 4, a flowchart depicts the processing of the automatic word-clustering module 140. The word-clustering processing commences in step 410 using word n-gram statistical data from module 130 as input. Preferably, the n-gram statistical data is that of bi-grams. In step 412, given a word list and the predetermined number N of classes, N words are selected from the word list as seeds for each class. For example, the word list preferably contains 80,000 words and the predetermined number N of classes is preferably 1000. Any of a number of techniques may be practiced to select the seeds for each class. Preferably, the word list is sorted by uni-gram statistics and the most frequent N words are selected as the seeds. Alternatively, bi-gram statistics can be used to determine the most frequent N words as seeds. Still further, the seeds can be manually selected. Other techniques of selecting the seeds can be utilized without departing from the scope and spirit of the invention.

In step 414, a word is selected from the word list from outside the classes (for the case of 80,000 words, the word is selected from the remaining 80,000–N words), and the n-gram statistical data of the word is obtained. Preferably, the bi-gram statistics of the word are used. In step 416, the similarity of the word with all the classes is computed using the n-gram statistical data to find the most similar class. After N steps of comparison, the most similar class can be determined. In step 418, the selected word is added to the most similar class and its word n-gram data is merged with the n-gram data of that class. In decision block 420, a check is made to determine if the last word in the list has been finished, i.e. if all of the words have been put into the classes. If decision block 420 returns false (No), processing continues at step 414 and the next word is selected. Otherwise, if decision block 420 returns true (Yes), the word clustering processing terminates in step 422.

To create word classes that correspond to the categories of name entities, different categories of named entities can be selected as representative seeds and added into the lexicon for automatic word classification to create word classes of these proper names. This must be done before the word segmentation stage, so that statistical information of these words in the context of the training corpus 110 can be obtained during the word uni-gram and bi-gram calculation process. After the automatic word clustering process, mappings between the entity categories can be built with some of the automatically created classes in which the representative seeds fall.

Using the framework of n-gram models, entity models can be built by training the models with the segmented name entity corpus 110. To deal with the sparse data problem, the automatic word-clustering module 140 creates the class n-gram models, where the number of classes is much smaller than the number of classes used in the contextual model.

Lattice Construction

Given a lexicon and an ideographic language sentence with words that are within the scope of the lexicon, the possible word arrangements for the sentence can be found by scanning the sentence character-by-character from left to right; the sub-string on the left side can be matched mechanically with the lexicon. This is one of the steps of building up the word lattice where all the word arrangements of a sentence are enumerated.

However, processing words outside the system vocabulary or bigger units in the sentences (such as named entities) is not as simple. The entity suggestion process, which is the reverse process of feature extraction, suggests names by going through the word lattice obtained in the above step, combining all those lattice elements with the features of which can satisfy the finite state grammars described by formula (1). The suggested entities, together with their possible class identifications and associated entity categories, are added into the word lattice.

Figure 5:
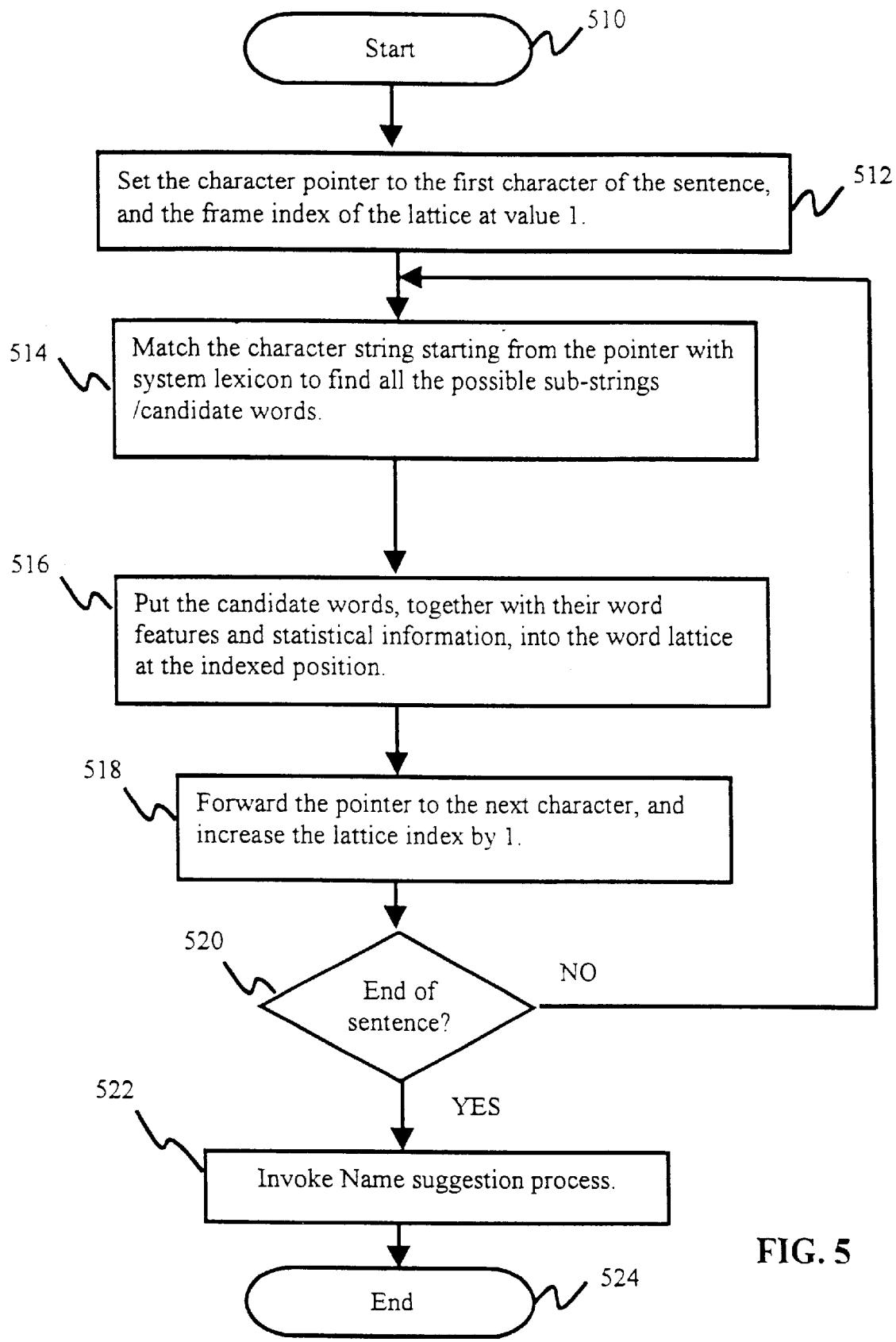
FIG. 5 is a flow diagram depicting the lattice-construction processing of the module 220 of FIG. 2.
Figure 11:
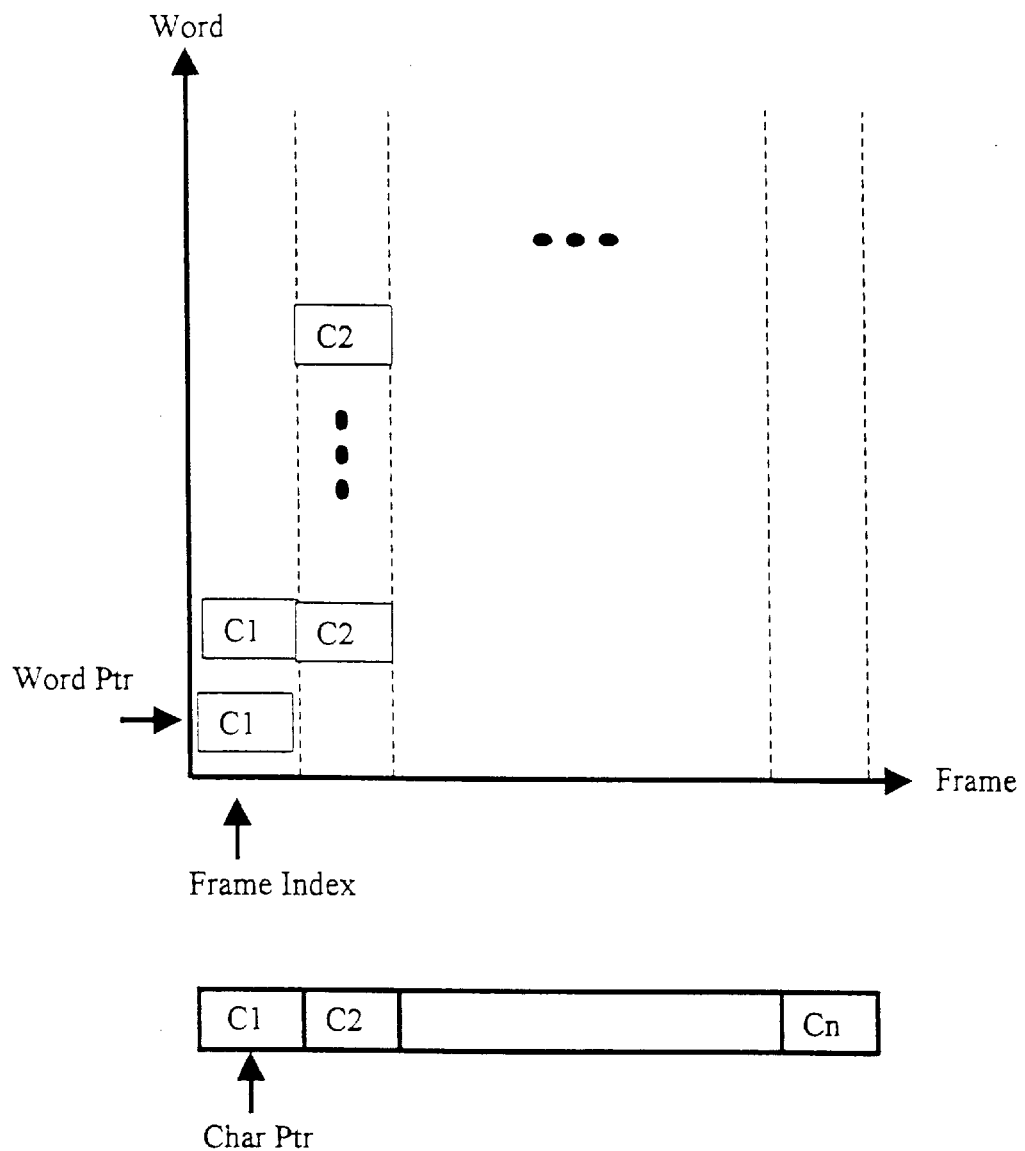
FIG. 11 is a diagram depicting a word lattice derived from a sentence containing ideographic characters.

The processing of the lattice constructor module 220 is depicted in FIG. 5. In step 510, processing commences to build a word lattice for a sentence. In step 512, a character pointer is set to the first character of the sentence and the frame index of the lattice is set at a value of 1. The character pointer indicates the starting character of a sub-string under consideration, that is, the first character of the sentence. The first frame is selected as the current frame in which words are to be put. With reference to the example of FIG. 11, a character pointer is directed to the first character "C1" in a character string. The frame index is depicted in FIG. 11 pointing at the first frame. Dashed vertical lines indicate the frame boundaries.

In step 514, the character string starting from the pointer is matched with the system lexicon to find all possible sub-strings/candidate words. In FIG. 11, two words are indicated in the first frame having the characters "C1"and "C1C2", respectively. In step 516 candidate words are put into the word lattice at the indexed position. Along with the candidate words, their word features (i.e., entity features) and statistical information are put into the word lattice. In step 518, the character pointer is moved forward to the next character in the sentence, and the lattice index is increased by 1. In decision block 520, a check is made to determine if the character pointer has reached the end of the current sentence. If decision block 520 returns false (No), processing continues at step 514 for the next character in the sentence. Otherwise, if decision block 520 returns true (Yes), processing continues at step 522. In step 522, name suggestion processing is carried out on the word lattice. In step 524, lattice construction processing for the sentence terminates.

Figure 6:
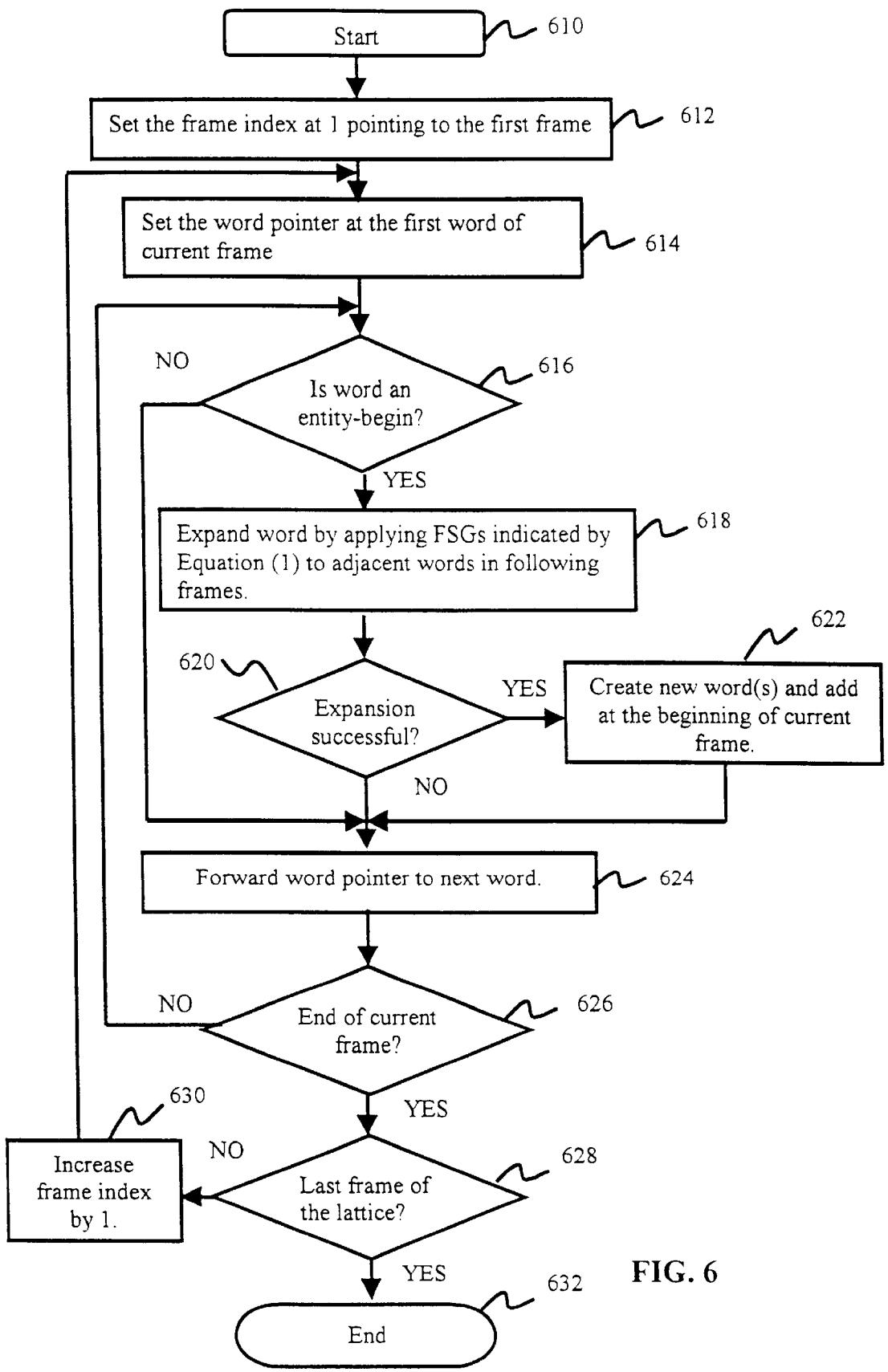
FIG. 6 is a flow diagram depicting the named-entity suggestion processing of step 522 of FIG. 5.

The name suggestion process of step 522 is depicted in FIG. 6. Processing commences in step 610. In step 612, a frame index is set at value of 1, pointing to the first frame of the word lattice. In step 614, a word pointer is set at the first word of the current frame, indicating that this is the current word under consideration. In FIG. 11, the word pointer is depicted as initially pointing at the word "C1". In decision block 616, a check is made to determine if the current word in the lattice has the feature of "entity-begin". If decision block 616 returns false (No), processing continues at step 624. Otherwise, if decision block 616 returns true (Yes), processing continues at step 618. In step 618, the current word is expanded by applying finite state grammars (FSGs) indicated by Equation (1) to adjacent words in following frames. This is done by expanding from the entity-begin feature by looking at the next character/word until an end feature is encountered. The expansion produces one or more entity candidates, meaning that the expansion succeeded, or none, meaning that the expansion failed.

In decision block 620, a check is made to determine if the expansion is successful. If decision block 620 returns false (No), processing continues at step 624. Otherwise, if decision block 620 returns true (Yes), processing continues at step 622. In step 622, a new word(s) is (are) created and added at the beginning of the current frame. There could be more than one type of entity. For each entity, create a word at the beginning of the frame. Processing then continues at step 624.

In step 624, the word pointer is moved forward to the next word in the same frame. In decision block 626, a check is made to determine whether the word pointer has reached the end of current frame. If decision block 626 returns false (No), processing continues at decision block 616 to check if the (next) word is an entity begin. If decision block 626 returns true (Yes), processing continues at decision block 628. In decision block 628, a check is made to determine if the current frame is the last frame of the word lattice. If decision block 628 returns false (No), processing continues at step 630. In step 630, the frame index is increased by one. The current frame under consideration is changed to the next one in the lattice. Processing then continues at step 614. Otherwise, if decision block 628 returns true (Yes), processing continues at step 632. In step 632, the name suggestion processing terminates. The output of the processing of FIG. 6 is still a lattice, but it now contains more named entities (e.g., person, organization, place, etc.). The suggested names in the lattice may be indicated by a flag, indicating whether or not a name is suggested. Alternatively, if a flag is not used, a suggested name may be indicated by each suggested name not having a class code or a class code that is equal to zero.

Statistical Decoding

Traditionally, a language model assigns a probability value to each string of words, $w=w_1 w_2 \ldots w_n$, taken from a prescribed vocabulary. The statistical parameters of the words in the vocabulary are obtained from the training corpus. This is applicable to the process of estimating both the probabilities of sentences and the probabilities of named entities. When a sentence is processed, $w_i$ indicates words in the sentence. The problem is to estimate the joint probability of word string $w_1 w_2 \ldots w_n$. When a named entity is processed, $w_i$ indicates constituents of a named entity. The problem is then to estimate the joint probability of the constituent sequence, and this probability is used as the lexicon parameter of the entity.

Formally, using the class bi-gram language model formalism, the probability of a word strng w is described as follows:

$$P(w) = \prod_{i=1}^{n} p(c_i|c_{i-1}) p(w_i|c_i), \quad (2)$$

where $c_i$ represents a class identification. The term $P(c_i|c_{i-1})$ indicates the contextual parameters, and $p(w_i|c_i)$ is the lexicon parameters.

In the statistical decoder module 230 of FIG. 2, the classes are regarded as prescribed, and the vocabulary is regarded as dynamic. Consequently, the newly suggested named entities are new words, and their classes associated with their categories fall into one of the prescribed classes. Among all these word classes, only those associated with named entities are of concern.

Figure 7:
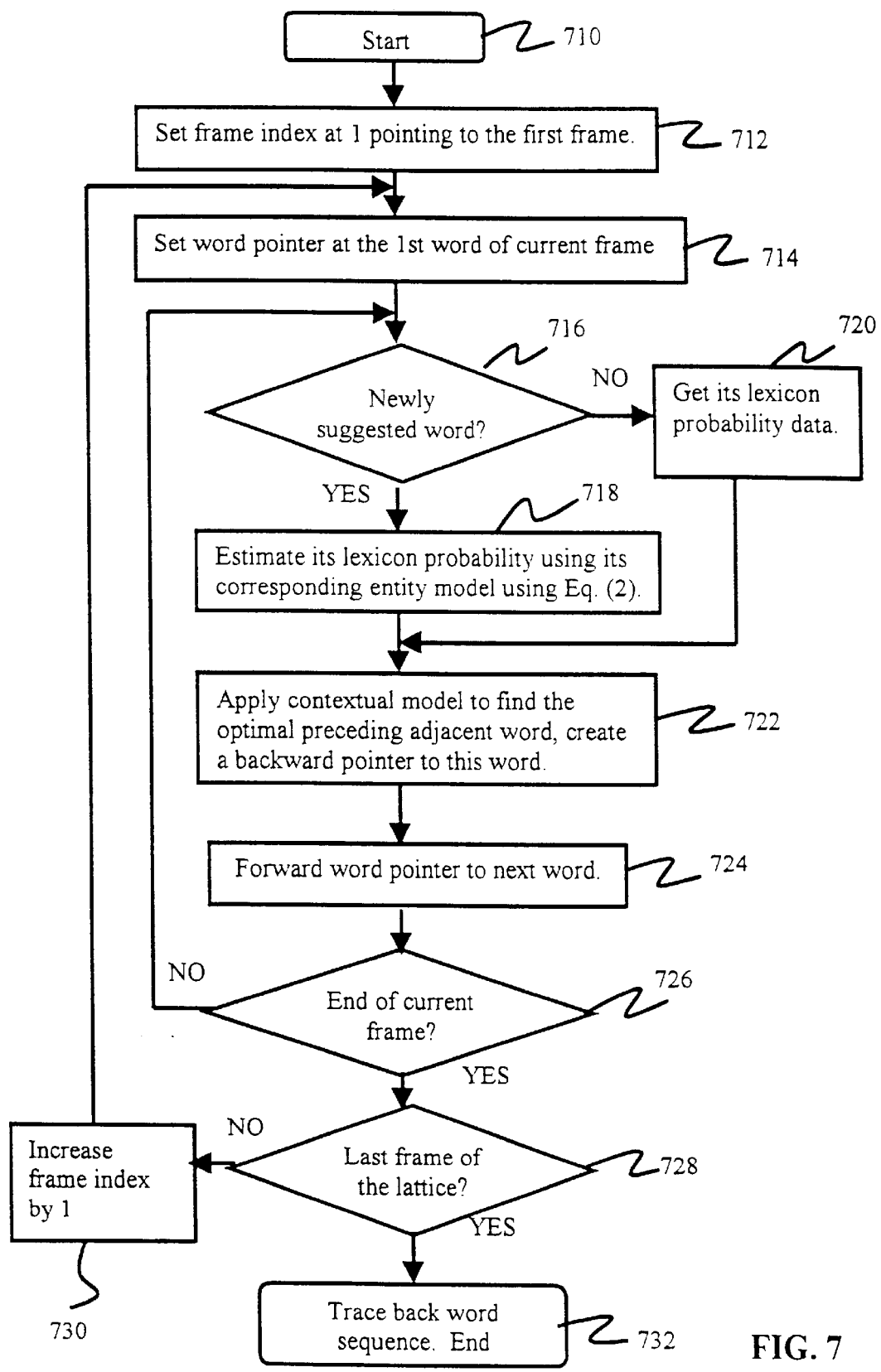
FIG. 7 is a flow diagram depicting the statistical decoding processing of module 230 of FIG. 2.

Given a word lattice obtained from the lattice constructor module 220, the statistical decoder module 230 estimates probabilities of all word strings and all named entities and finds the most probable word string and its associated word class sequence. There are many ways to find this most probable sequence. Preferably, a Viterbi search engine is used, as depicted in FIG. 7. In step 710, processing commences. In step 712, the frame index is set at a value of 1 for the first frame, indicating that this is the current frame under consideration.

Figure 12:
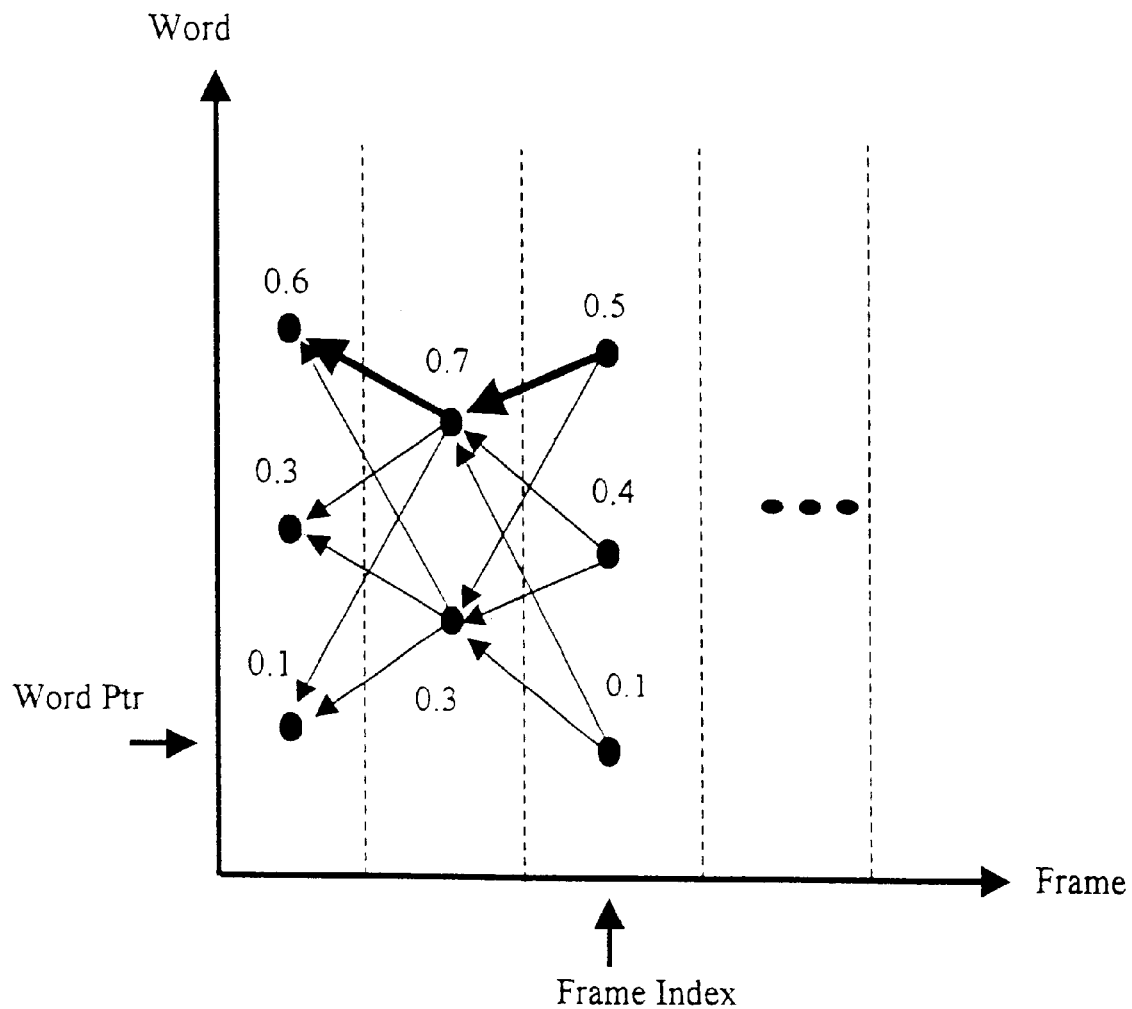
FIG. 12 is a diagram illustrating the probabilities of words and corresponding back pointers.

In step 714, the word pointer is set at the first word of the current frame, indicating that this is the current word under consideration. In decision block 716, a check is made to determine if the current word in the lattice is a newly suggested entity. If decision block returns false (No), processing continues at step 720. In step 720, the lexicon probability data of the word is obtained from the contextual language model data. Processing then continues at step 722. Otherwise, if decision block 716 returns true (Yes), processing continues at step 718. In step 718, the lexicon probability of the entity is estimated from its corresponding entity models under the formalism of Equation (2). Processing then continues at step 722. FIG. 12 illustrates the probabilities for a number of words in three frames. To simplify the drawing, each word is represented by a black circle with an associated probability.

In step 722, the contextual model is applied to find the optimal preceding adjacent word, and a backward pointer to that word is created. This is done to find the most probable sub-string ending at the current word and to estimate and memorize that word's probability. Under the formalism of Equation (2), the probabilities of the sub-string ending at the preceding adjacent words and the probabilities between the current word and its preceding adjacent words are combined. A pointer is created to point to the most probable preceding word. Step 722 is not performed for frame 1. The word bi-gram statistics are preferably used to find the conditional probability. In step 724, the current word pointer is moved forward to the next word to begin preparing for possible processing of the next word.

In decision block 726, a check is made to determine if the current word pointer is pointing the end of current frame. If decision block 726 returns false (No), processing continues at decision block 716 to process the next word. Otherwise, if decision block 726 returns true (Yes), processing continues at decision block 728. In decision block 728, a check is made to determine if the last frame of the lattice has been reached. If decision block 728 returns false (No), processing continues at step 730. In step 730, the frame index is increased by one. Processing then continues at step 714. Otherwise, if decision block 728 returns true (Yes), processing continues at step 732. In step 732, the backward pointer of the most probable word is traced back in the last frame, and the word sequence and entity information, if any, are then output. In FIG. 12, this is indicated by two thick arrows between nodes having probabilities 0.6, 0.7 and 0.5 in the first three frames, respectively. Processing then terminates in step 732.

Figure 8:
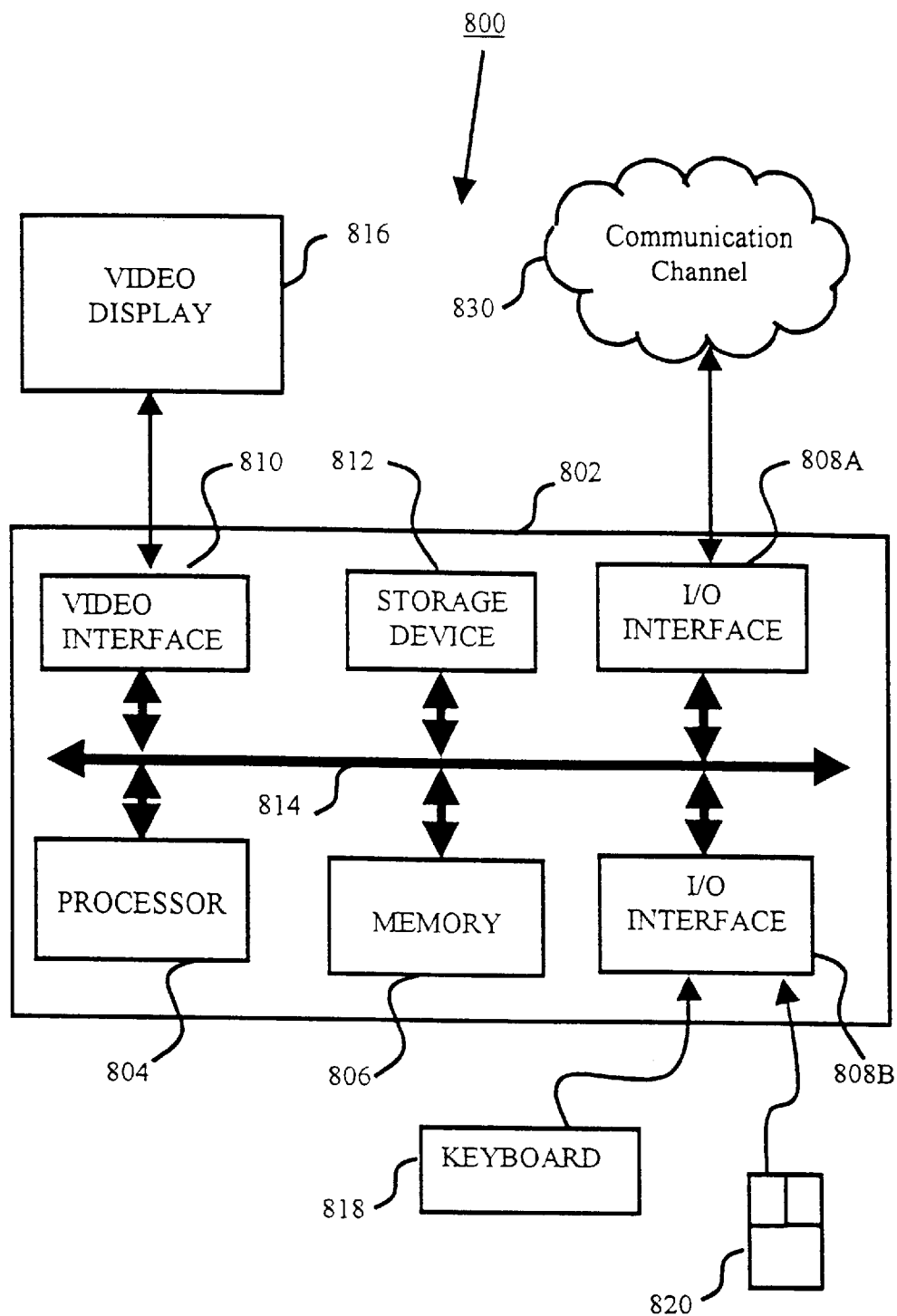
FIG. 8 is a block diagram illustrating a general-purpose computer, with which the embodiments of the invention can be practiced.

The embodiments of the invention are preferably implemented using a computer, such as the general-purpose computer shown in FIG. 8. In particular, the processing or functionality of FIGS. 1–7 can be implemented as software, or a computer program, executing on the computer. The method or process steps for tokenization and named entity recognition of an ideographic language are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for tokenization and named entity recognition of an ideographic language in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808b using an appropriate communication channel 830 such as a modem communications path, a computer network, or the like. The computer network may include a local area network (LAN), a wide area network (WAN), an Intranet, and/or the Internet.

The computer 802 itself consists of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparestation (TM), a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and intermediate data and any data fetched from the network man be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

In the foregoing manner, a method, an apparatus, a computer program product and a system for tokenization and named entity recognition of ideographic language are described. While only a small number of embodiments are described, it will be apparent to those skilled in the art in view of this disclosure that numerous changes and/or modifications can be made without departing from the scope and spirit of the invention.

What is claimed is:

1. A method of tokenization and named entity recognition of ideographic language, said method including the steps of:
    generating a word lattice for a string of ideographic characters using finite state grammars and a system lexicon, said finite state grammars are a dynamic and complementary extension of said lexicon for creating named entity hypotheses and said lexicon includes single ideographic characters, words, and predetermined features of said characters and words;
    generating segmented text by determining word boundaries in said string of ideographic characters using said word lattice dependent upon a contextual language model and one or more entity language models; and
    recognizing one or more named entities in said string of ideographic characters using said word lattice dependent upon said contextual language model and said one or more entity language models.

2. The method according to claim 1. further including the step of combining said contextual language model and said one or more entity language models.

3. The method according to claim 1, wherein said contextual language model and said one or more entity language models are each class-based language models.

4. The method according to claim 1, wherein said contextual language model and said one or more entity language models incorporate local and contextual linguistic information, respectively, for producing prioritized word and corresponding category sequences.

5. The method according to claim 4, wherein said contextual language model and said one or more entity language models are dependent upon an n-gram paradigm.

6. The method according to claim 1, wherein said lattice generating step includes the step of generating one or more elements of said lattice using said lexicon.

7. The method according to claim 1, wherein said finite state grammars run on said predetermined features contained in said lexicon to suggest possible entities, entity boundaries and entity categories.

8. An apparatus for tokenization and named entity recognition of ideographic language, said apparatus including:
    means for generating a word lattice for a string of ideographic characters using finite state grammars and a system lexicon, said finite state grammars are a dynamic and complementary extension of said lexicon for creating named entity hypotheses and said lexicon includes single ideographic characters, words, and predetermined features of said characters and words;
    means for generating segmented text by determining word boundaries in said string of ideographic characters using said word lattice dependent upon a contextual language model and one or more entity language models; and
    means for recognizing one or more named entities in said string of ideographic characters using said word lattice dependent upon said contextual language model and said one or more entity language models.

9. The apparatus according to claim 8, further including means for combining said contextual language model and said one or more entity language models.

10. The apparatus according to claim 8, wherein said contextual language model and said one or more entity language models are each class-based language models.

11. The apparatus according to claim 8, wherein said contextual language model and said one or more entity language models incorporate local and contextual linguistic information, respectively, for producing prioritized word and corresponding category sequences.

12. The apparatus according to claim 11 wherein said contextual language model and said one or more entity language models are dependent upon an n-gram paradigm.

13. The apparatus according to claim 8, wherein said lattice-generating means includes means for generating one or more elements of said lattice using said lexicon.

14. The apparatus according to claim 8, wherein said finite state grammars run on said predetermined features contained in said lexicon to suggest possible entities, entity boundaries and entity categories.

15. A computer program product having a computer readable medium having a computer program recorded therein for tokenization and named entity recognition of ideographic language, said computer program product including:

computer program means for generating a word lattice for a string of ideographic characters using finite state grammars and a system lexicon, said finite state grammars are a dynamic and complementary extension of said lexicon for creating named entity hypotheses and said lexicon includes single ideographic characters, words, and predetermined features of said characters and words;

computer program means for generating segmented text by determining word boundaries in said string of ideographic characters using said word lattice dependent upon a contextual language model and one or more entity language models; and computer program means for recognizing one or more named entities in said string of ideographic characters using said word lattice dependent upon said contextual language model and said one or more entity language models.

16. The computer program product according to claim 15, further including computer program means for combining said contextual language model and said one or more entity language models.

17. The computer program product according to claim 15, wherein said contextual language model and said one more entity language models are each class-based language models.

18. The compute program product according to claim 15, wherein said cotextual language model and said one or more entity language models incorporate local and contextual linguistic information, respectively, for producing prioritized word and corresponding category sequences.

19. The computer program product according to claim 18, wherein said contextual language model and said one or more entity language models are dependent upon an n-gram paradigm.

20. The computer program product according to claim 15, wherein said computer program means for lattice-generating includes computer program code means for generating one or more elements of said lattice using said lexicon.

21. The computer program product according to claim 15, wherein said finite state grammars run on said predetermined features contained in said lexicon to suggest possible entities, entity boundaries and entity categories.

* * * * *